United States Patent [19]

Kloc et al.

[11] Patent Number: 5,241,565
[45] Date of Patent: Aug. 31, 1993

[54] METHOD AND APPARATUS FOR EFFECTING EFFICIENT TRANSMISSION OF DATA

[75] Inventors: Dennis Kloc, Jamaica Plain; Richard A. Carey, Ashland, both of Mass.

[73] Assignee: Microcom Systems, Inc., Wilmington, Del.

[21] Appl. No.: 720,638

[22] Filed: Jun. 25, 1991

[51] Int. Cl.⁵ ............................................ H04B 15/02
[52] U.S. Cl. ........................................ 375/58; 375/8; 455/72; 455/127
[58] Field of Search .................. 375/58, 98, 99, 8–10, 375/39; 455/69, 70, 72, 10, 52.1, 127; 332/107; 379/98

[56] References Cited

U.S. PATENT DOCUMENTS

| | | | |
|---|---|---|---|
| 4,004,224 | 1/1977 | Arens et al. | 455/10 |
| 4,309,771 | 1/1982 | Wilkens | 375/58 |
| 4,910,792 | 3/1990 | Takahata et al. | 455/69 |
| 5,128,965 | 7/1992 | Henriksson | 375/58 |

Primary Examiner—Curtis Kuntz
Assistant Examiner—Young Tse
Attorney, Agent, or Firm—Schiller & Kusmer

[57] ABSTRACT

A telecommunications system intermittently checks and, if necessary, adjusts the power level of the transmitted data as a function of the transmission characteristics of the transmission line so as to optimize transmission performance.

10 Claims, 5 Drawing Sheets

METHOD AND APPARATUS FOR EFFECTING EFFICIENT TRANSMISSION OF DATA

This invention relates generally to a telecommunications system adapted to transmit digital data, and more particularly to a system which intermittently checks and, if necessary, adjusts the power level of the transmitted data as a function of transmission characteristics of the transmission line so as to optimize transmission performance.

BACKGROUND OF THE INVENTION

While microcomputers were once only used as dedicated and completely isolated devices, they are now used for a wide range of applications, many of which require microcomputers to communicate with each other or with larger centrally located computers. This communication frequently is accomplished over voice grade communication channels. Modems are used to convert digital data from the computer to analog data for transmission over these voice grade communication channels and subsequent redigitization upon receipt. As signal processing techniques have advanced, modem technology has also advanced providing the capability of transmitting at higher speeds over voice grade channels. Problems maintaining the data integrity across the communications channel have developed with such high speed communication because the higher speed data transmission methods are more vulnerable to noise interference within the communication channel. To facilitate higher speed communications, communications protocols have been developed to detect and correct data transmission errors and ensure data integrity across the channel.

A communication protocol is basically a set of rules that defines how communicating devices interact. For one device to transfer data successfully to another, both devices must observe the same protocol. Typically, a protocol specifies when to send a message, how to format the information in the message, and at the other end, how to acknowledge the receipt of the message.

Simple physical connect protocols are concerned only with hardware configurations. Establishing the basic physical connection between two modems requires that a particular series of steps be followed. The originating modem initiates its sending sequence, and the telephone number representing the electronic address of the receiving modem is formatted as a series of pulses or tones and sent to the telephone network. The receiving modem senses the incoming call as a relatively high voltage (sufficient to cause a phone to ring) and interprets this as a request to establish a connection. The modems then proceed to establish the physical connection via a series of signal exchanges that result in a particular connection protocol. Such a connection is possible because both modems use the same physical connect protocol. These basic physical connect protocols are fairly standard. CCITT specifications V.22, V.22bis, V.29, V.32 and V.32bis are common as well as Bell 212A. These physical level protocols do not ensure error free communication.

Connecting two computers is only a small part of the communications work necessary for accurate data transfer. As described in greater detail below, the transmission medium through which the data is sent is often noisy, and errors can crop up in the transmitted data. These errors must be: detected and corrected. The resources available to store incoming data also must be passed and matched so that the recipient is not flooded with data. These concerns, therefore, go beyond the physical level protocols. A higher level protocol is required to ensure error free communications.

One protocol which enables error free communications between modems is the Microcom Networking Protocol (MNP) which has been developed by Microcom, Inc. of Norwood, Mass. MNP provides a sophisticated communications system which includes provisions for both reliable terminal-type interactive communications and reliable file transfer. MNP provides sophisticated error checking and correction as well as data compression. MNP is widely used to provide error free communications.

The MNP protocol, which has been developed principally for use with microcomputers, includes three layers, and the use of only three layers enable MNP to provide the necessary services with the desired space and performance characteristics for a microcomputer environment. The three layers or modules are combined to perform a series of complex functions in a manner in which changes in one module may not drastically affect another module, as long as certain parts of the module's interface remain the same.

In MNP, each layer is relatively isolated and provides a specific service. If a change is forced in one layer (for example, if MNP is modified for use on a new computer), the change is confined to that layer while the layer's standard interface to the other layers remains unchanged. In addition to ensuring machine portability, MNP's structure allows services provided by one layer to support those in the layer above. The accumulation of services is then passed upward, from layer to layer to the applications program. MNP defines three unique protocol layers in addition to the physical connection; the link, the session, and the file protocol layers. The protocol layers are triggered sequentially from the bottom (physical) to the top (file transfer).

The link layer is responsible for providing reliable, controlled data transmission over a medium that is inherently noisy and likely to cause errors. Once a physical connection is established between two modems, the link protocol acts as a negotiator causing both devices to agree on the nature of the link. For example, the link protocol establishes whether the connection will be half- or full-duplex, how many data messages can be sent before confirmation is required, the size of a single data packet, etc. As will be more evident hereinafter, the link protocol utilized in the preferred embodiment is modified to include the necessary information to carry out the principles of the present invention. After establishing values for the above requirements, the link protocol initiates data transfer, paces the flow of data and, if necessary, re-transmits data messages that contain errors due to telephone line noise. The link protocol allows blocks or packets of data (as opposed to individual bytes) to be sent synchronously or asynchronously to the receiving computer. Data transfer is faster when packets are transmitted synchronously because start and stop characters are not needed, and as a result, the ratio of data to control characters regulating the transfer is higher. Control is possible because of a mainframe-like (framing) technique in which a block of data is carried from both ends with specific codes.

In order for any communications protocol to facilitate communications among a wide variety of computers, the protocol must be able to operate in a number of modes. These modes include a matched-protocol mode for use by two communicating devices supporting the same protocol. Such a matched-protocol mode may provide optimized data transmission including a number of known optimizing features such as detecting and correcting errors, data compression, and optimizing transmission speed. The latter is achieved in the link layer of the MNP protocol by sensing the error rate. Should the error rate be too high at the receiving end, the receiving end provides an indication that the signal to noise ratio is too low for the attempted modulation rate (i.e., baud rate) so the transmitting modem downshifts, i.e., transmits at a slower modulation rate to improve signal quality. Conversely, should the transmission of data be error free the receiving modem can instruct the transmitting modem to upshift to a higher modulation or baud rate so that data can be transmitted at a higher and more efficient modulation rate so as to increase data throughput without sacrificing quality.

Certain communication channels, such as cellular networks, are particularly noisy. The noise levels in the transmission channels are directly related to the signal to noise ratio, which in turn is directly related to the available throughput (the maximum rate at which information can pass through the particular transmission channel). Even worse, as transmission of a signal passes from one cell to another cell in a cellular communications network the quality of the line can abruptly change. This wide range of line quality can result in demodulation errors. Worse, the line temporarily can disconnect resulting in disruption in the line. While such disruption can be acceptable for voice communications it can be disastrous for data transmission since the carrier signal, and thus a great deal of transmitted data, can be lost. In the latter situation the two modems must be "retrained" so that the two modems are suitably resynchronized with one another and data can be transmitted between the two.

This problem is exacerbated because companding techniques often are utilized in cellular communications because the dynamic range of the transmission medium is particularly small (the power level range between a floor where noise will mask a transmitted signal, and a ceiling where transmitted signals saturate and thus distort). Accordingly, signals are first dynamically compressed prior to being transmitted through the transmission channel, and subsequently dynamically expanded when received from the transmission medium so as to preserved the dynamic range of the original signal. When compressing a signal the gain impressed on the transmitted signal is automatically controlled as a function of the power level of the original signal so that the power level is actually boosted for low power levels and attenuated for high power levels by a predetermined compression factor (as a function of the dynamic range of the transmission medium). Thus, a greater range of power levels of the transmitted signal, once compressed, can be transmitted within the narrower dynamic range of the transmission channel. The signal is expanded in a complementary manner at the receiving modem so that the signal is restored to its original dynamic range without distortion or loss. This compression and complementary expansion factor (i.e., companding factor) is typically determined by the location of the floor and ceiling of the dynamic range of the transmission medium, and for cellular communications is specified in cellular network standards. It is customary that the power level of the original signal is preset at a predetermined level above the noise floor of the transmission channel when transmitting the signal so as to optimize the transmission performance. This easily can be done for a communication channel where the dynamic range and noise floor are fairly fixed. However, in cellular communications as the transmission of a signal is passed from one cell to another, the transmission characteristics of the channel may change (i.e., the attenuation drop can vary), which in turn can result in the power level of the received signal dropping below the noise floor. This can result in the noise masking the signal causing data to be lost or received in error. Thus, the optimum power level for transmission through one cellular transmission channel may not be optimum for another.

OBJECTS AND SUMMARY OF THE INVENTION

It is therefore a principal object of the present invention to provide an improved system for and method of transmitting data in which the power level of the transmitted signal is adaptive to transmission characteristics of the transmission line so as to optimize transmission performance.

Another object of the present invention is to provide a system for and method of data transmission in which the optimum power level of the transmitted signal is intermittently determined in real time as a function of the transmission characteristics of the transmission channel.

Still another object of the present invention is to provide a data communications system and method in which the optimum power level for transmitting signals between two modems is updated when upshifting or downshifting the modulation rate, or retraining to resynchronize the modems.

Yet another object of the present invention is to provide an improved data communications system and method, particularly useful for compressed signals transmitted over a communications channel, in which the power level of the transmitted signal is optimized as a function of the intermittently measured quality of the transmission channel through which the signal is transmitted.

These and other objects of the present invention are provided by an improved data communications system and method which intermittently updates, and changes if necessary, the power level of a transmitted signal as a function of the location of the noise floor of the transmission channel and line attenuation so as to approximate the power level for optimum transmission performance through the channel and accommodate changes in transmission characteristics in the channel.

Other objects of the invention will in part be evident and will in part appear hereinafter. The invention accordingly comprises the processes involving the several steps and the relation and order of one or more of such steps with respect to each of the others, and the apparatus possessing the construction, combination of elements, and arrangement of parts which are exemplified in the following detailed disclosure, and the scope of the application of which will be indicated in the claims.

BRIEF DESCRIPTION OF THE DRAWINGS

For a fuller understanding of the nature and objects of the present invention, reference should be had to the following detailed description taken in connection with the accompanying drawings wherein.

DETAILED DESCRIPTION OF THE PREFERRED EMBODIMENT

Figure 1:
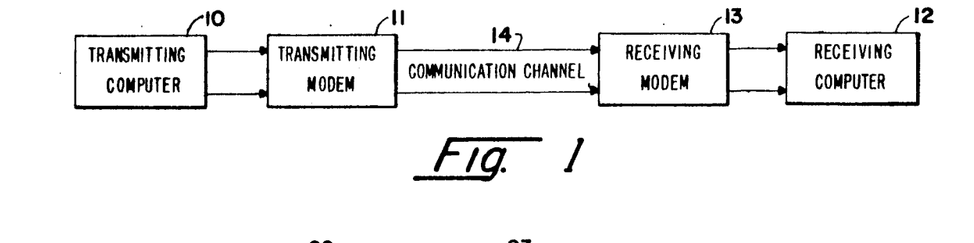
FIG. 1 is a generalized schematic view of a data telecommunications system of the type including two modems incorporating the present invention.

A basic data telecommunications system incorporating the present invention is shown in FIG. 1 and includes a transmitting unit of data terminal equipment (DTE) 10, such as, but not limited to, a dumb terminal or a microcomputer, and a receiving unit of DTE 12. An initiating modulator/demodulator (modem) 11 is connected between unit 10 and a communication channel (such as, but not limited to a cellular network transmission channel) and a receiving modem 13 is connected between unit 12 and communication channel 14. It should be appreciated that while designating one computer and modem as initiating and the other computer and modem as receiving, in reality in most instances both are capable of transmitting and receiving data between one another through the transmission channel. Thus, the designations are for convenience, with the designations "initiating" and "transmitting" used to mean that a computer and modem are transmitting data, and the designation "receiving" used to indicate that a computer and modem are receiving data from the transmitting modem.

Figure 2:
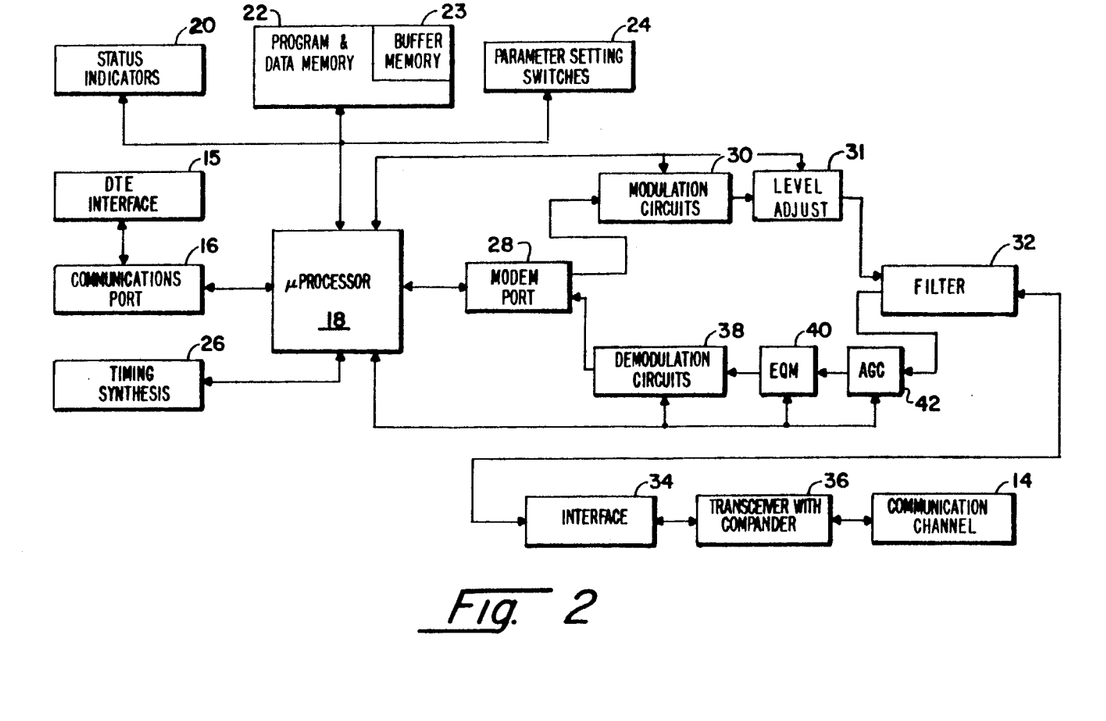
FIG. 2 is a schematic view of a modem of the present invention.

A modem of the communication system of the present invention is shown in greater detail in FIG. 2. The communications system of the present invention will normally include at least two modems of the type described below. For purposes of the following discussion, the modem of the system will be describe with reference to both the transmitting and receiving modes, and thus will apply to each of the modems 11 and 13 of FIG. 1. The modem shown in FIG. 2 incudes a DTE-interface 15 which receives data coming from corresponding DTE unit. Data characters supplied to the DTE-interface 15 pass through a communications port 16 of the microprocessor 18 to which characters are fed either in a serial or parallel fashion. The microprocessor 18 has connected to it status indicators 20, a program and data memory 22 (the latter including a buffer memory 23) and parameter setting switches 24. Timing synthesizing circuitry 26 is also connected to the microprocessor 18. Data processed by the microprocessor 18 is sent through a modem port 28 to modulation circuits 30 which in turn will pass data through a gain control or level adjust circuit 31 (for reasons described hereinafter) and a filter 32 before applying the signals to the interface 34. In the case of cellular network transmission, the signal is applied to a transceiver 36, equipped with a compander for compressing the transmitted signal before transmitting the signal over the communication channel 14 to the remote modem. The modulation circuits 30 preferably are adapted to modulate the signal to be transmitted in accordance with a quadrature amplitude modulation (QAM) technique at any one of several modulation or baud rates, which can change with an upshifting, downshifting or retraining operation, which will be described in greater detail hereinafter in connection with a description of the preferred embodiment of the present invention.

The modem of FIG. 2 also includes demodulation and data recovery circuits 38 used for receiving and demodulating data from another remotely situated modem. When the modem of FIG. 2 acts as a receiving modem, data passes through transceiver 36 (where the transmitted compressed signal is expanded to its original dynamic range), interface 34 and filter 32 to the circuits 38. The demodulation rate is set based on the modulation rate. Accordingly, provision is made as a part of the link protocol for determining the modulated rate at which data is to be transmitted and setting the demodulation and data recovery circuits 38 accordingly.

According to the present invention, the modems of the system function to intermittently update, and change if necessary, the power level of a transmitted signal as a function of the line quality (i.e., in the preferred embodiment the location of the noise floor of the transmission channel) and an indication of the received level of the transmitted signal (i.e., in the preferred embodiment the received level is an indication of line attenuation) so as to approximate the power level for optimum transmission performance through the channel and accommodate changes in transmission characteristics of the channel.

Figure 3:
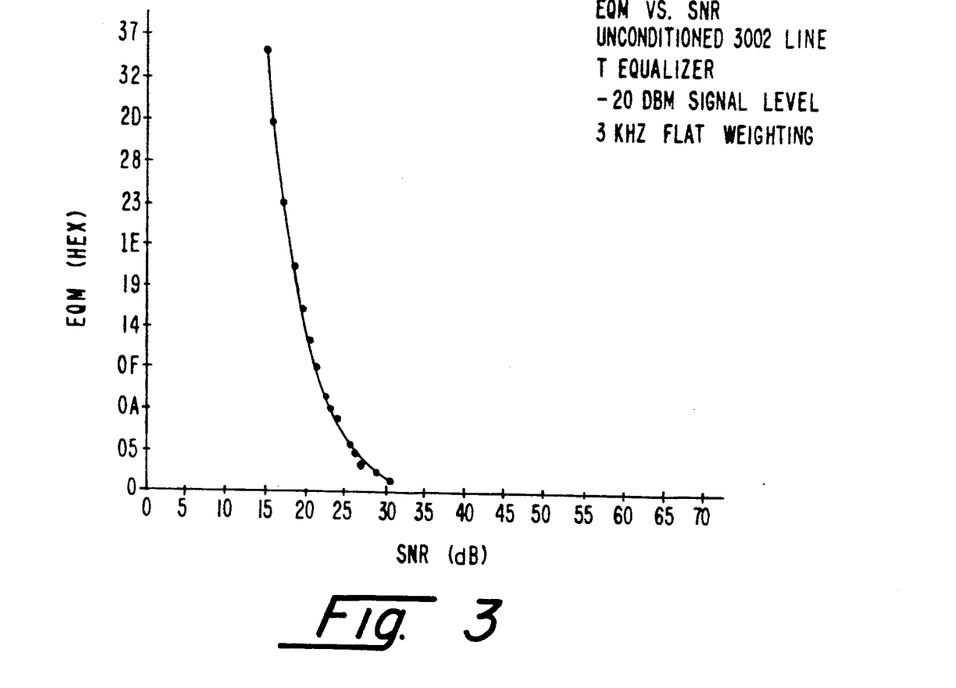
FIG. 3 is a graphical illustration showing an example of a typical relationship of eye quality monitor data and the signal to noise ratio of the transmission channel for quadrature amplitude modulated (QAM) signals.

More specifically, as indicated in FIG. 3, as is well known there is a relationship between what is referred to as the eye quality monitor (EQM) value and the signal to noise (S/N) ratio (and thus the position of the noise floor) of the transmission channel 14. Thus, the EQM value is one measure (when transmitting a QAM signal) of line quality. The EQM value is determined as the filtered squared magnitude of the error vector, the latter being defined as the angle and magnitude difference between an actual received signal point of a QAM signal, and its ideal location in the baseband signal plane. As is well known in the art the EQM value may be obtained by processing the error vector data to obtain a positive hexadecimal value whose magnitude is an indicator of the quality of the received signal or probability of error of received signal points. See Laiz, Carlos; "Quality of Received Data for Signal Processor-based Modems"; Rockwell International; Document No. 29220N71; Application Note Order No. 671; February, 1985; pages 1-20. In accordance with the present invention, an EQM value is preselected as a function of the minimum permissible S/N so that the power level of the transmitted signal is as close to the noise floor as permitted without significant loss of information. The ideal power level is initially presumed to be −10 dB, although this will vary in accordance with the principles of the present invention based upon the attenuation over the transmission channel. Accordingly, the modem of the present invention includes means 40, connected with the demodulation circuits 38, for providing a signal (preferably as a function of the EQM value determined from a signal received over the channel 14) to the microprocessor 18, representative of the line quality, i.e., preferably the current S/N as sensed, in real time, from the signals received from the remote modem, and thus the location of the noise floor of the channel 14.

Figure 4:
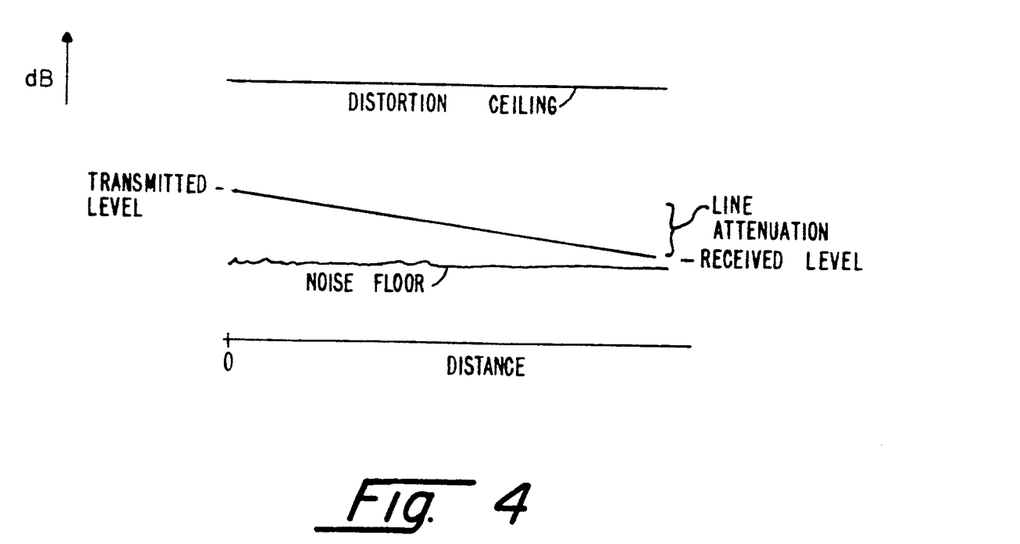
FIG. 4 is a graph illustrating the limits of power level of a transmitted signal through a transmission channel of a typical cellular network.

While the EQM value provides a good indication of how far the received signal is from the noise floor in the communication channel, for a given level of transmitted signal, the level of the received signal (i.e., the line attenuation) can vary and thus, there is no indication of what the power level of signal should be when transmitting the signal over the channel 14 so as to provide a desired level of received signal. More specifically, as illustrated in FIG. 4, the power level of the transmitted signal drops as a function of the attenuation along the transmission channel. Ideally, the EQM value of the received signal should be representative of a S/N as small as possible without the noise masking the signal so as to utilize as much of the dynamic range of the transmission channel as possible. Thus, if a particular line attenuation is assumed and the power level is set based upon a particular EQM value which place the received signal as close as possible to the noise floor at the receiving end, a line providing greater attenuation may result in the signal falling below the noise floor, while a line providing less attenuation may result in signal saturation. Accordingly, means 42, connected with the means 40, are provided for intermittently measuring, in real time, the attenuation along the channel 14 so that the power level can be set so that the EQM value at the received end of the channel 14 is at the appropriate preselected value. Means 42 therefore provides a signal representative of the line attenuation of the channel 14, referred to in the preferred embodiment as the "AGC value". Preferably, the line attenuation is intermittently checked by transmitting a signal as a known power level and measuring the power level of the received signal. The circuits 30, 31 and 38 and means 40 and 42 are of a type that all provided within a commercially available modem chip set, such as the chip set manufactured and sold by Rockwell International of Newport Beach, Calif. as the RC9696/12. As such no claims are made that these components by themselves form the invention, but rather the invention resides in the manner in which they are utilized within the entire system shown in FIG. 2.

According to the present invention, the preferred modem of FIG. 2 intermittently checks and, if necessary, changes the power level of the transmitted signal from one modem to another by determining the EQM value provided by the EQM means 40 and the AGC value provided by means 42. Each time the EQM and AGC values are determined at the remote modem, the values are transmitted back as a part of the link protocol. Having the two measurements provides an accurate measure of line transmission characteristics so that the transmit power level can be set as low as possible without the transmitted signal falling below the noise floor.

The optimization is preferably performed intermittently and in real time so that changes in the transmitting environment will result in changes in transmitted power level thereby maintaining optimum throughput.

Figure 5:
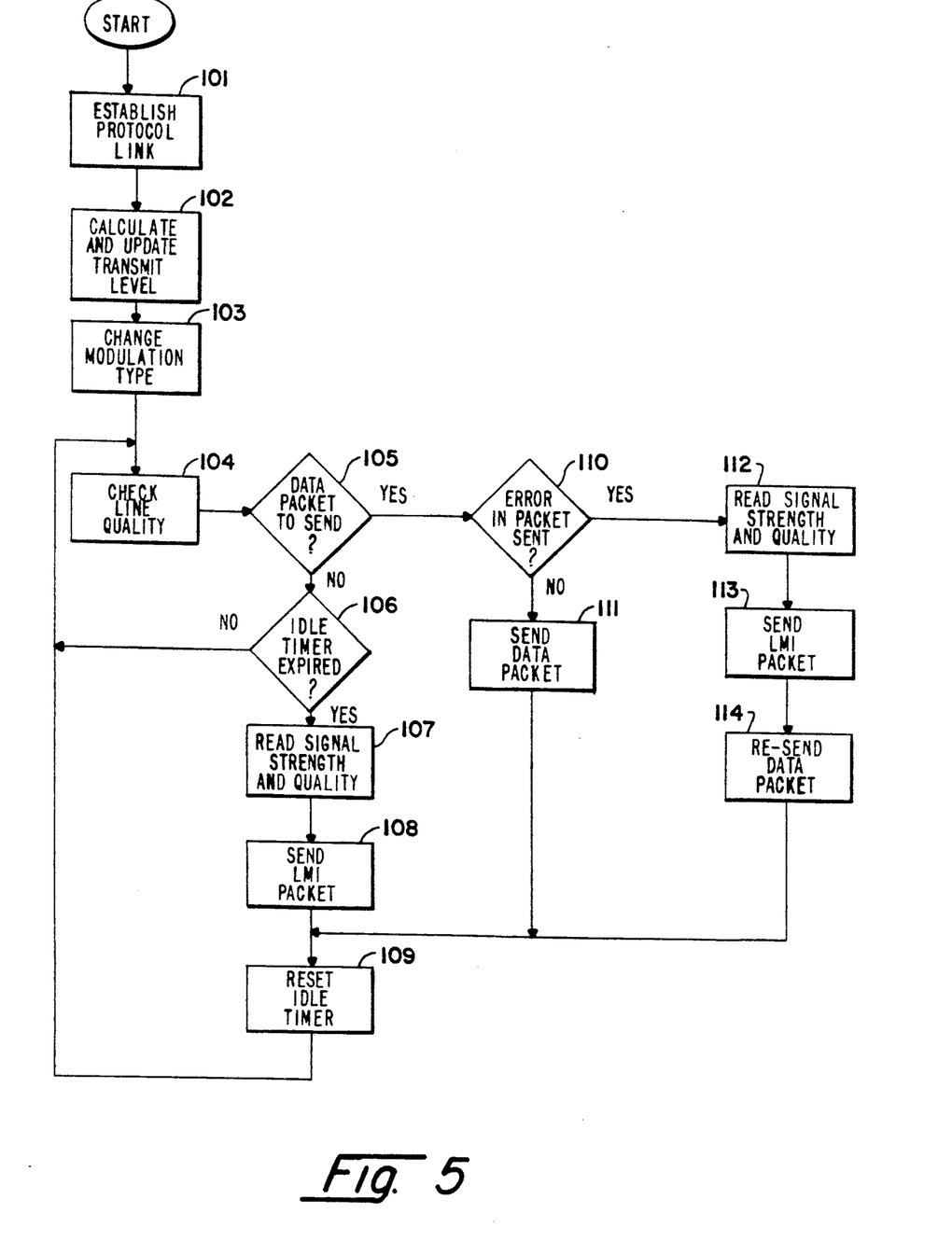
FIG. 5 is a flow diagram of the steps utilized by the modem of the present invention in optimizing the transmitted power level as a function of transmission characteristics of the transmission line.
Figure 6:
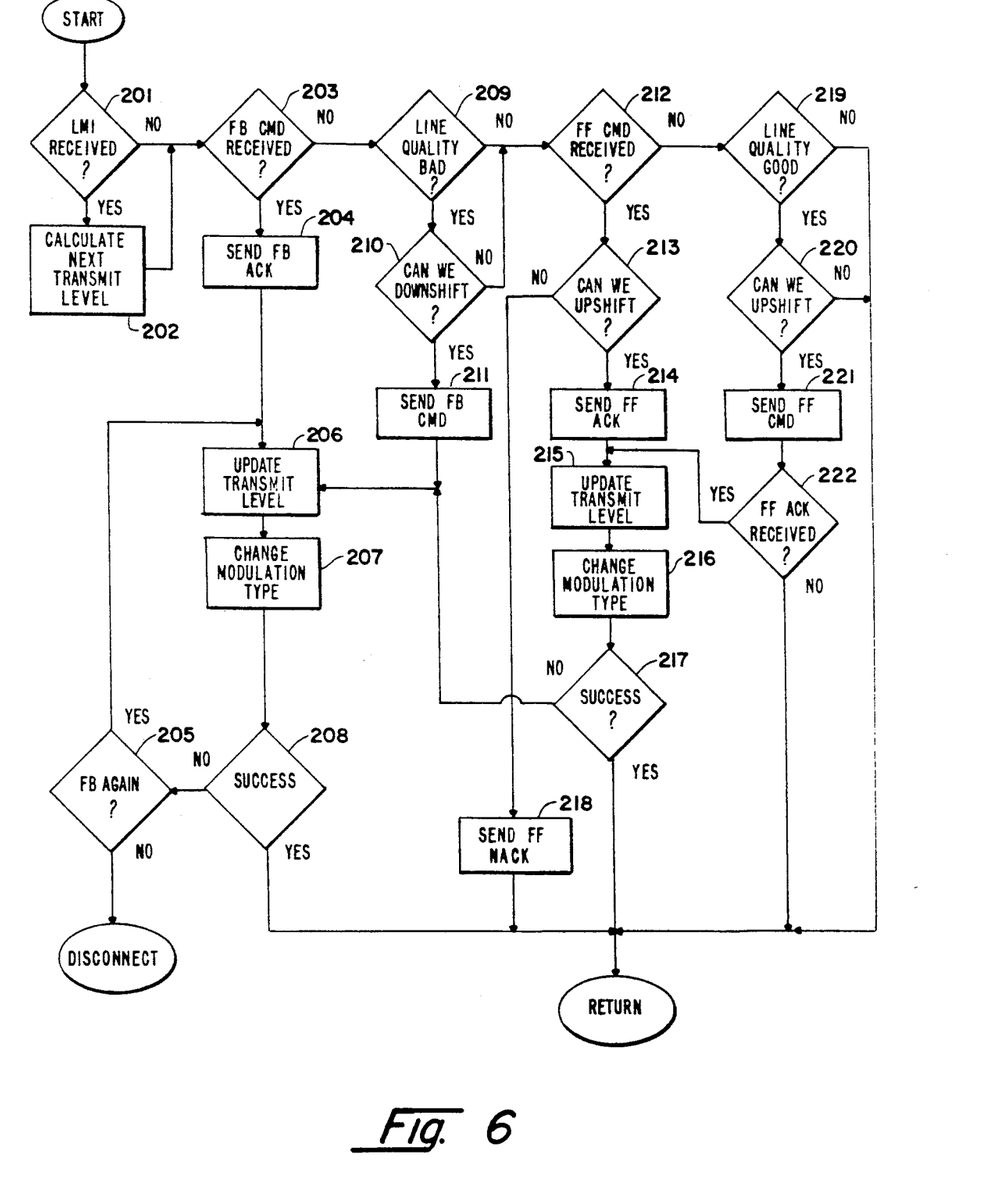
FIG. 6 is a flow diagram of a subset of steps utilized by the modem of the present invention relating to the check line quality step 104 of the flow diagram of FIG. 5.
Figure 7:
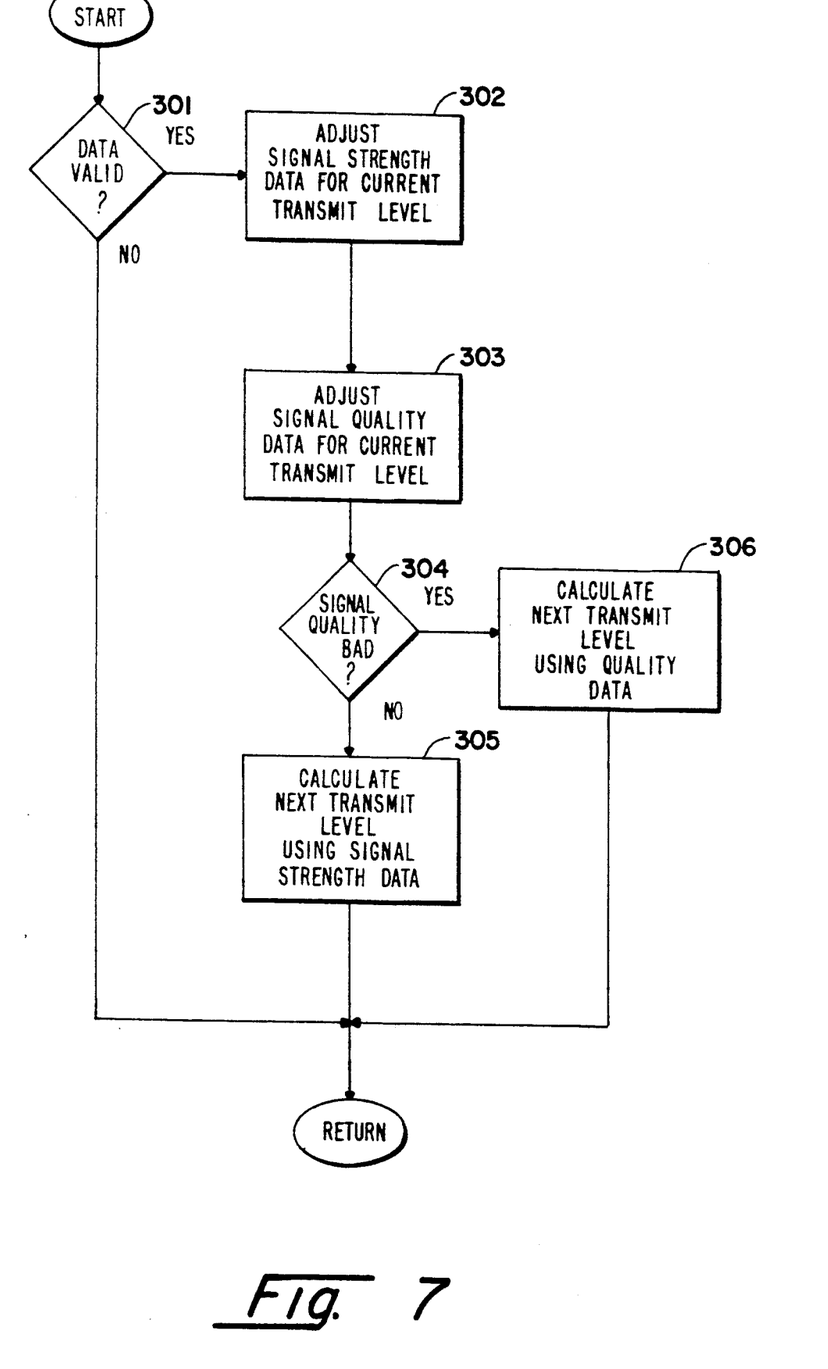
FIG. 7 is a flow diagram of a further subset of steps utilized by the modem of the present invention relating to the update transmit level steps 206 and 215 of the flow diagram of FIG. 6.

In accordance with the present invention the optimization of the transmitted power level is performed during upshifts or downshifts of the modulation rate of the transmitted signal, or during retraining when two modems are reconnected. Referring to FIGS. 5-7, the flow diagrams show the operation of the modem in carrying out the principles of the present invention, and preferably use the MNP protocol to transmit local data and receive remote data. The preferred program code for carrying out the steps of the optimization of the power level is carried out in the microprocessor 18, and is described and shown in Appendix A.

Specifically referring to FIG. 5, the steps described, with the exception of steps 104, 107 and 112, are well known as a part of the error control function of the MNP protocol and are described as a part of the preferred embodiment within which the principles of the present invention are utilized. As shown in FIG. 5, the error correction function of microprocessor 18 polls the hardware to obtain the values of EQM and AGC from means 40 and 42 necessary to carry out error correction and adjust the power level in accordance with the present invention. In this regard the system generates the link management idle packet in order to establish a connection between the two modems. Specifically, at step 101 of FIG. 5, the protocol link is established, i.e., the originating modem sends a link request to the remote modem. The receiving modem receives and evaluates the link request to determine what it can support and sends back similar information. In this regard the information exchanged between the two modems include the current values of EQM and AGC, which as will be more evident hereinafter determines the initial power level at which the signal is to be transmitted as indicated at step 102. Initially, these values are set for a power level of −10 dB. After an initial settling time the values of EQM and AGC are read. In the preferred embodiment in accordance with the MNP protocol, if not already set at the highest modulation rate, it is preferred that the latter initially is chosen as the initial transmission rate at step 103.

Step 104 is the step at which the line quality is checked, and is described in the form of a series of substeps shown in flow diagram form in FIG. 6. Referring to FIG. 6, step 104 includes steps 201-222, all of which are intended to be a part of the MNP protocol, with steps 202, 206 and 215 being inserted within the protocol according to the principles of the present invention. More particularly, the subset of steps are designed to check the line quality. If the link management idle frame is received at step 201, the next transmit level is calculated at step 202 and in particular in accordance with the subset of steps shown in FIG. 7.

Referring to FIG. 7, calculations are made to determine the next transmit level so that the values can be updated at steps 206 and 215, described hereinafter. Specifically, at step 301 the values of EQM and AGC are validated. If the transmitting modem is unable to determine values provided by the remote modem, the transmitting modem transmits an indication of such (preferably an FFHex byte) within the LMI frame as a part of step 108 or 113 of FIG. 5, described hereinafter. The subset of steps of FIG. 7 then returns to step 203 of FIG. 6. If however, updated values can be determined, they are adjusted at steps 302 and 303 by the microprocessor. If, for example, the initial transmit level is set at −22 dB and the level is received at −30 dB, the line attenuation is −8 dB (the difference between the transmit and received levels). The preferred transmit power level at which the compander will provide unity gain is determining at step 302 based on the AGC value received from the other modem and the current transmit power level. In addition, the minimum transmit power level at which the noise floor will not interfere with the data transmission is determined at step 303 based on the AGC and EQM value received from the other modem and current transmit power level. Given the two measurements, the microprocessor utilizes an empirically determined table, shown in Appendix A to adjust the signal strength (power level) of the transmitted signal at step 302 based on one of the two measurements made at steps 302 and 303 by providing the appropriate command signals to the level adjust circuit 31 so as to adjust the power level of the transmitted signal to the level determined from the table. The values in the table of Appendix A have been empirically determined. As to which measurement is used to set the next power level will depend of the EQM value. If the EQM value indicates a high noise level at step 304, the processor will utilize the data acquired at step 303 to set the power transmit level from the table of Appendix A, as indicated at step 306. If, however, the EQM value indicates an acceptable noise level at step 304, the microprocessor proceeds to step 305 and calculates the new power level based on the AGC number from the table of Appendix A. In either event the microprocessor returns to step 203 shown in FIG. 6.

Referring again to FIG. 6, once the next transmit level has been determined, or if at step 201 a link management idle frame has not been received, the program proceeds to step 203 to see if the "fall back" command has been received. If the fall back command is received, indicating that the remote modem has decided to downshift so that the current modem will receive data at a slower rate, the microprocessor will provide an acknowledgement at step 204. The modem will first update the power level at which the modem will transmit at step 206 before proceeding to step 207 where the modulation rate is actually changed to the next lower rate. At step 208 the system checks to insure the downshift is successful, and if so the modem proceeds to step 105 of FIG. 5. If, however, the modem is not successful at step 208, the modem proceeds to step 205 to again try a fall back to a slower modulation rate. If successful at step 205, the system returns to step 206. However, if not, the modem proceeds to disconnect.

If at step 203 of FIG. 6 the fall back command is not received, the microprocessor proceeds to step 209, the quality of the line is measured at step 209 by sensing the EQM value provided in the EQM means 40 so as to determine whether the modem should downshift. If yes, the microprocessor proceeds to step 210 to determine whether the modem can operate at a slower speed. If yes, the modem sends a fall back command at step 211 and proceeds through steps 206, 207 and 208, (and step 205 if necessary) as previously described. If, however, the modem cannot downshift as determined at step 210 (the modem is operating at its slowest speed), or if at step 209 the line quality is not judged to be bad, the microprocessor proceeds to step 212.

At step 212, the modem checks to see if a fall forward command has been received from the remote modem, indicating that the remote modem wishes to operate at a faster modulation rate. At step 213 an inquiry is made as to whether the modem can operate at a faster speed, and if not the microprocessor proceeds to step 218 to send a fall forward negative acknowledgement indicating to the remote modem that the modem cannot operate at the faster speed. The program then returns to step 105 of the flow chart of FIG. 5. If, however, an upshift can occur the program proceeds to step 214, whereupon a fall forward acknowledgement signal is sent to the remote modem at 214, the transmit level data is updated (in an identical way as described above with respect to step 206, and substeps 301-306). The modulation rate is upshifted at step 216, and the system checks to be sure the upshift was successful at step 217. If not the system repeats the steps 206, 207, 208 (and if necessary 205) by again updating the transmit level and changing the modulation rate. If once again unsuccessful the system disconnects. If successful at step 208 or step 217, the system returns to step 105 of FIG. 5.

If a fall forward command is not received from the remote modem, the system proceeds to step 219. The line quality is again checked by reading the EQM value. If the line quality is still good, a determination is made whether to upshift at step 220. If yes, the system sends a fall forward command to the remote modem and waits for the fall forward acknowledgement signal to return at step 222. If the latter signal is received the system proceeds through steps 215, 216 and 217, and if unsuccessful at step 217 20 through steps 206, 207 and 208 (and step 205, if necessary). If unsuccessful at step 205, the system disconnects. If successful at step 217, or subsequently successful at step 208 the system returns to step 105 of FIG. 5. Similarly, if the line quality is judged at step 219 to be bad, or the modem cannot upshift at step 220, or the fall forward acknowledgement signal is not received at step 222, the system similarly returns to step 105.

Referring again to FIG. 5, at step 105, the microprocessor determines whether a data packet is to be sent. An idle timer is set at the end of the transmission of each data packet and allowed to run until the next packet is sent. Thus, the idle timer can be used to determined whether the two connected modems are idle (no data is being sent). The modems are considered idle if no data is sent within a predetermined period of time, e.g., 1.0 seconds. Thus, if no data packet is to be sent at step 105 the microprocessor proceeds to step 106 to determine whether the idle timer has expired. If no, the microprocessor proceeds back to step 104. If the idle timer has expired, the microprocessor proceeds to step 107 where the current EQM and AGC values are read from the EQM means 40 and AGC means 42. With the modems being determined in the idle state, the link management idle frame or packet is sent as indicated at step 108. The idle timer is then reset at step 109 and the program returns to step 104.

If at step 105 data is to be sent, the program proceeds to step 110, wherein the receiving modem checks to be sure that no errors in the packet received from the transmitting modem have occurred. If no, the next data packet can be sent as indicated at step 111, and the program proceeds to reset the idle time at step 109 before starting over at step 104. If an error is discovered at step 110 the signal strength and quality are both read at step 112 (in the same manner as step 107), and an link management frame is sent at step 113 (in the same manner as step 108), as described in greater detail in FIG. 7. From step 113, the program proceeds to step 114 whereupon the NAK'D (negative acknowledgement) data packet is retransmitted, the idle timer 109 is reset at step 109 and the program restarts at step 104.

The modem and its operation thus described provides an improved system for and method of transmitting data in which the power level of the transmitted signal is adaptive to line conditions so as to optimize transmission performance. The optimum power level of the transmitted signal is intermittently determined in real time as a function of the line conditions. The transmitted power level is updated when checking whether to upshift or downshift the modulation rate, or retraining to reconnect modems. The system and method are particularly useful for compressed signals transmitted over a transmission channel in which the power level of the transmitted signal is intermittently optimized as a function of the noise level within and the attenuation across the communication channel.

Since certain changes may be made in the above process and apparatus without departing from the scope of the invention herein involved, it is intended that all matter contained in the above description or shown in the accompanying drawing shall be interpreted in an illustrative and not in a limiting sense.

Appendix A - DTLA Code

```
;*****************************************************************
;*
;*   LOW_TMIT - changes the transmit level (on the fly)
;*
;*          for the 24t,M/C 96 change I/O port 60
;*          according to the following map:
;*
;*     bit | 7 | 6 |5-0| trans level
;*         ---------------------
;*         | 0 | 0 | X | -18 db power up default
;*         | 0 | 1 | X | -10 db normal domestic
;*         | 1 | 0 | X | -22 db
;*         | 1 | 1 | X | -25 db cellular default
;*
;*
;*          for the MicroPorte change I/O control port (0xx20h)
;*          according to the following map:
;*
;*     bit | 7 | 6 | 5 |4-0| trans level
;*         ---------------------
;*         | X | 0 | 0 | X | -10 db normal domestic and power up default
;*         | X | 0 | 1 | X | -18 db
;*         | X | 1 | 0 | X | -22 db
;*         | X | 1 | 1 | X | -25 db cellular default
;*
;*
;*****************************************************************
*
LOW_TMIT IF  MICRO
        LD   A,(TMIT_LVL)        ; get the transmit level
        AND  M_TMITBITS          ; mask off unwanted bits
        LD   B,A
        LD   A,(PR_TMIT)
        AND  MP_TMIT
        OR   B
        LD   (PR_TMIT),A
        OUT  (P_TMIT),A          ; output to the transmit level port
    ELSE ; MICRO
        LD   A,(TMIT_LVL)        ; get the transmit level
        OUT  (P_TMIT),A          ; output to the transmit
    ENDIF ; MICRO
        RET ;*****************************************************************
;**
;* GET_AGC - reads the most significant byte from the Hycom's internal
;*           registers. If an AGC value can not be read, a value of FFH
;*           is returned.
;*****************************************************************
GET_AGC EQU     $
        PUSH    BC               ; save counters and pointers
        PUSH    HL               ; from the LR build
NEW_AGC LD      A,RAM_AGC        ;get RAM pointer
        DI
        PUSH    AF               ;save on stack
        STRREG  REG_RAMD         ;RWSEL and BYTSEL = 0 selects LSB
        LD      B,2
```

```
TRYAGAIN  IN      A,(REG_RAMRQ)       ;request RAM processing
          OR      MC_RAMRQ
          OUT     (REG_RAMRQ),A       ;request RAM processing
          IN      A,(REG_RAMRQ)       ;request RAM processing
          AND     00000010B
          JR      NZ,OK1
          DJNZ    TRYAGAIN
OK1       LD      A,2                 ;watch dog for hung chip
          LD      B,PK_RAMACK         ;wait for hycom acknowledge
          CALL    PEND80
          JR      C,BAD_RAM           ; jump if wait longer than 12.5 - 25 ms
          DI                          ; pend EI's so protect against ram change
          GETREG  REG_RAMA            ; read AGC it and
          EI                          ; OK to enable now
          LD      D,A                 ; save it in E (lsb)
          POP     AF                  ; get back the RAM address
          SET     MCB_MSB,A           ; set for MSB of RAM value
          DI
          STRREG  REG_RAMD            ;RWSEL =0, BYTSEL = 1 selects MSB
          LD      B,2
TRY_AGAIN IN      A,(REG_RAMRQ)       ;request RAM processing
          OR      MC_RAMRQ
          OUT     (REG_RAMRQ),A       ;request RAM processing
          IN      A,(REG_RAMRQ)       ;request RAM processing
          AND     00000010B
          JR      NZ,OK2
          DJNZ    TRY_AGAIN
OK2       LD      A,2                 ;watch dog for hung chip
          LD      B,PK_RAMACK         ;wait for hycom acknowledge
          CALL    PEND80
          JR      C,BAD_RAM2
          DI
          GETREG  REG_RAMA            ; read it and
          LD      E,A                 ; save it in D (msb)
          EI
SET_BAD
          LD      (AGC_WORD),DE       ; value returned in BC
          POP     HL
          POP     BC
          RET

BAD_RAM   POP     AF
BAD_RAM2  LD      DE,0FFFFH
          JR      SET_BAD

;*******************************************************************
;*  SAV_AGC - Saves the AGC value in LR Parm 13 pointed to by
;*            HL.Calculates the next transmit level for link upshift from
;*            1200 bps.
;*
;*            IN - HL
;*            OUT- nothing
;*            DESTROYS - nothing
;*******************************************************************
SAV_AGC   EQU     $
          PUSH    AF                  ; SAVE
          PUSH    BC
          PUSH    DE
          PUSH    HL
          LD      A,(HL)              ; get current agc in A
          LD      (AGC_RCVD),A        ; save it
          CALL    MAX_TMIT            ; max tmit returned in A
          LD      (TMIT_LVL),A        ; load in the current level
          LD      (NEWTMIT_LVL),A     ; load in the next tmit level
          POP     HL
          POP     DE
          POP     BC
          POP     AF
          RET
```

```
            RET2CF

;*****************************************************************
;* GET_AGCEQM - returns an AGC value based on the EQM received via the
;*              LMI. The value returned is used to prevent transmit
;*              levels from going to low.
;*
;*              IN  - nothing
;*              OUT - reg A contains AGC value as func of EQM
;*              DESTROYS - ALL
;*****************************************************************
GET_AGCEQM   EQU  $ ; diags
        LD      HL,CEL_MAP          ; get the cell function map (S37)
        BIT     B_EQMAGC,(HL)       ; is the AGC based on EQM bit set?
        RET     Z                   ; return if it is not set LD      A,(MCBCBR)          ; get the current baud rate
        CPC     C_1200B             ; if at 1200 TMIT_LVL does not
        LD      A,MINUS_10DB        ; reflect the true output lvl of -10 dB
        JR      Z,EQMAT_10DB        ; jump if at 1200 bps
        LD      A,(TMIT_LVL)        ; else, from the current transmit level EQMAT_10DB
        AND     M_TMITBITS          ; mask unwanted bits for table lookup
        LD      C,A                 ; find which EQM trip point table (by
        LD      HL,TBL_TMITLVL      ; offset) used to find min transmit
                                    ; level.
        LD      DE,TBL_EQMTMIT      ; the offset to the correct EQM table
        CALL    TBLFIND             ; is returned in the A reg.
        LD      B,0                 ; B is cleared
        LD      C,A                 ; load offset (reg A) into BC
        LD      HL,TBL_10DBEQM      ; and ADD the offset to the location
        ADD     HL,BC               ; of the first table
        LD      A,(EQM_RCVD)        ; put received AGC value in A for CP's
        LD      B,3                 ; loop 3 times (if not found must be
                                    ; the 4th)
        LD      DE,AGC_25DB         ; point to corresponding AGC values LOOPEQM                             ; start search for AGC as func of EQM CP      (HL)                ; CP'ing EQM_RCVD to EQM TBL entries to
        JR      C,GOT_IT            ; find out which AGC value corelates to
        INC     HL                  ; EQM_RCVD
        INC     DE                  ; keep looping till found or beyond the
        DJNZ    LOOPEQM             ; max EQM table value (loop 3 if not
                                    ; found point to 4th and last entry)

GOT_IT  LD      A,(DE)              ; here coresponding AGC value from EQM
        DEC     A                   ; make it one less for CP in MAX_TMIT
        RET                         ; found and returned in reg. A ;*****************************************************************
;* MAX_TMIT - calculates the maximum transmit level allowed based on an
;*            AGC value (corrected AGC or AGC as func of EQM). If the
;*            AGC value is FFh or (AT)Nn odd )then the default value
;*            (S36) is chosen.
;*
;*            IN  - reg A, AGC value
;*            OUT - reg A, next tmit value
;*            DESTROYS - ALL
;*****************************************************************
MAX_TMIT EQU $
        LD      B,A                 ; save the corrected AGC value in B
        CP      0FFH                ; was it bad ?
        LD      A,(DFLT_LVL)        ; get the max allowed by S36
        JR      Z,LD_LVL            ; jump if bad AGC level received, use
                                    ; default ; diags
        BIT     0,A                 ; if it's an odd # force atttenuation
        JR      NZ,LD_LVL           ; to the S36 setting LD      A,B                 ; else, find the correct setting from
```

```
AGC
        LD      B,3                     ; load the # of loops in the search
        LD      HL,AGC_25DB             ; point to the table of AGC trip values
        LD      DE,TBL_TMITLVL          ; point to coresponding table transmit
                                        ; values
AGCLOOP CP      (HL)                    ; compare received AGC with table of
                                        ; AGC trips
        JR      C,TMIT_FOUND            ; if table greater than reg A then tmit
                                        ; found
        INC     DE                      ; else point to next lower tmit value
        INC     HL                      ; point to next higher AGC trip value
        DJNZ    AGCLOOP                 ; loop until done
; here if decided on or transmit level
TMIT_FOUND
        LD      A,(DE)                  ; get tmit valu into reg A for return
        LD      HL,DFLT_LVL             ; point to default level from AT)N cmd
        CP      (HL)                    ; if default level is lower than calc
        RET     C                       ; then return and use calculated value
USE_DFLT_TMITD                          ; here to use the value set by AT)Nxx
        LD      A,(HL)                  ; put tmit value in A for return
LD_LVL  RET ;****************************************************************
;* Table of bit patterns for changing transmit levels
;****************************************************************
TBL_TMITLVL EQU $
        db      MINUS_25DB      ; bit pattern for -25dB
        db      MINUS_22DB      ; bit pattern for -22dB
        db      MINUS_18DB      ; bit pattern for -18dB
        db      MINUS_10DB      ; bit pattern for -10dB
        db      0FFH TBL_10DBEQM EQU  $
LTH10 EQU $-TBL_10DBEQM  ; distance from TBL_10DBEQM
        db      03H     ;EQM trip point for -25db when at -10db
        db      08H     ;EQM trip point for -22db when at -10db
        db      10H     ;EQM trip point for -18db when at -10db
        db      40H     ;EQM trip point for -10db when at -10db
        db      0FFH TBL_18DBEQM EQU  $
LTH18 EQU $-TBL_10DBEQM  ; distance from TBL_10DBEQM
        db      03H     ;EQM trip point for -25db when at -18db
        db      0AH     ;EQM trip point for -22db when at -18db
        db      12H     ;EQM trip point for -18db when at -18db
        db      40H     ;EQM trip point for -10db when at -18db
        db      0FFH TBL_22DBEQM EQU  $
LTH22 EQU $-TBL_10DBEQM  ; distance from TBL_10DBEQM
        db      08H     ;EQM trip point for -25db when at -22db
        db      12H     ;EQM trip point for -22db when at -22db
        db      14H     ;EQM trip point for -18db when at -22db
        db      40H     ;EQM trip point for -10db when at -22db
        db      0FFH TBL_25DBEQM EQU  $
LTH25 EQU $-TBL_10DBEQM  ; distance from TBL_10DBEQM
        db      08H     ;EQM trip point for -25db when at -25db
        db      12H     ;EQM trip point for -22db when at -25db
        db      16H     ;EQM trip point for -18db when at -25db
        db      40H     ;EQM trip point for -10db when at -25db
        db      0FFH
```

```
;*******************************************************
;* table of offset values to each of the EQM trip points based
;* on current transmit level.
;*******************************************************
TBL_EQMTMIT            ; distance are from TBL_10BEQM
        db    LTH25    ; distance to table of EQM trip points for -25dB
        db    LTH22    ; distance to table of EQM trip points for -22dB
        db    LTH18    ; distance to table of EQM trip points for -18dB
        db    LTH10    ; distance to table of EQM trip points for -10dB
        db    OFFH ;*******************************************************
;* tables used from diagnostic S registers 43 through 50
;*******************************************************

;* table used for AGC values from EQM trip points &
;* table of transmit levels from AGC trip points
AGC_25DB
        db    01H      ;S43    AGC_25DB
        db    14H      ;S44    AGC_22DB
        db    1DH      ;S45    AGC_18DB
        db    40H      ;S46    AGC_10DB ;* table of correction values for AGC at each transmit level
TMITAGC_25DB
        db    10H      ;S47    TMITAGC_25DB
        db    0CH      ;S48    TMITAGC_22DB
        db    08H      ;S49    TMITAGC_18DB
        db    00H      ;S50    TMITAGC_10DB
```

1. A system for optimizing the transmission power level for transmitting compressed signals over a transmission medium having transmission characteristics, including the noise level in and the signal attenuation through the medium, which may change over time, said system comprising:
   means, including means for setting the power transmission level of the compressed signal, for transmitting the compressed signal;
   means for intermittently sensing characteristic information about said transmission medium representative of the noise level in and the signal attenuation through said transmission medium; and
   means for determining the power level setting of transmitted compressed signals through the transmission medium as a function of the sensed characteristic information from a range of values of power level settings, said power level settings being determined as a function of a range of said characteristic information so as to provide optimized transmission performance by minimizing distortion from compression of the signals and transmission of the compressed signals through the transmission medium, said means for determining the power level setting including means for determining when a change in the power level setting is necessary;
   wherein said means for setting the power transmission level of the compressed signal adjusts the setting of the power transmission level when said means for determining said power level determines a change in said power level setting.

2. A system according to claim 1, wherein said means for intermittently sensing characteristic information about said transmission medium representative of the noise level in and the signal attenuation through said transmission medium includes means for generating a first signal as a function of the noise level in said transmission medium, and means for generating a second signal as a function of the signal attenuation along said transmission medium.

3. A system according to claim 2, wherein said means for generating said first signal generates said first signal as a function of signal to noise ratio of a received signal transmitted through said medium.

4. A system according to claim 3, wherein said signal transmitted over said transmission medium is quadrature amplitude modulated, and said means for generating first signal as a function of the signal to noise ratio includes means for determining the eye quality monitor value of said received signal.

5. A system according to claim 2, wherein said means for generating said second signal includes means for generating a signal at an initial power level along said medium so that the attenuation can be measured along said medium.

6. A system according to claim 2, wherein said means for determining the power level setting of transmitted compressed signals through said transmission medium includes means for storing a table of values of power transmission levels empirically determined as the appropriate values of power transmission levels as a function of the noise level and line attenuation.

7. A system according to claim 2, wherein said means for intermittently sensing characteristic information about said transmission medium representative of the noise level in and the signal attenuation through said transmission medium includes means for generating a signal at an initial power level along said medium so that the initial line attenuation and noise level can be measured across the medium.

8. A system according to claim 1, wherein said means for intermittently sensing characteristic information about said transmission medium representative of the noise level in and the signal attenuation through said transmission medium includes:

means for determining (a) the power level at which said compressed signals are transmitted at unity gain, and (b) the minimum level at which noise in the medium will not interfere with the data transmission; and means for selecting a power level value from said range of values based on the determined power level at which said compressed signals are transmitted at unity gain and the determined minimum level at which noise in the medium will not interfere with the data transmission.

9. A method of optimizing conditions for transmitting and receiving compressed signals over a cellular transmission channel such that the received compressed signals through the cellular transmission channel define a value representative of noise level and a value representative of the line attenuation of the channel, wherein each value may change over time, said method comprising the steps of:

intermittently sensing the value representative of the noise level and the value representative of the line attenuation of said cellular transmission channel;

selecting from a table of predetermined values of transmitted power level the appropriate transmitted power level as a function of the sensed values which provides optimized transmission of the compressed signals as a function of channel attenuation and noise level; and adjusting the transmitted power level of compressed signals transmitted over said transmission channel to said selected power level with changes in sensed values when necessary so as to maintain optimize transmission performance as a function of channel attenuation and noise level.

10. A method according to claim 9, wherein said step of selecting from a table of predetermined values of transmitted power level the appropriate transmitted power level as a function of the sensed values which provide optimized transmission of the compressed signals includes the steps of:

determining (a) the power level at which said compressed signals are transmitted at unity gain, and (b) the minimum power level at which noise in the channel will not interfere with the data transmission; and selecting a power level from said table of values based on the determined power level at which said compressed signals are transmitted at unity gain and the determined minimum level at which noise in the medium will not interfere with the data transmission.

* * * * *

UNITED STATES PATENT AND TRADEMARK OFFICE
CERTIFICATE OF CORRECTION

PATENT NO. : 5,241,565
DATED : August 31, 1993
INVENTOR(S) : Dennis Kloc, Richard A. Carey It is certified that error appears in the above-indentified patent and that said Letters Patent is hereby corrected as shown below:

Claim 10, column 22, line 20, after "level" insert -- value --.

Signed and Sealed this

Fifth Day of April, 1994

Attest:

BRUCE LEHMAN

Attesting Officer

Commissioner of Patents and Trademarks